March 4, 1924.
G. STOLZE
STOVEPIPE FASTENER
Filed April 19, 1923
1,485,736
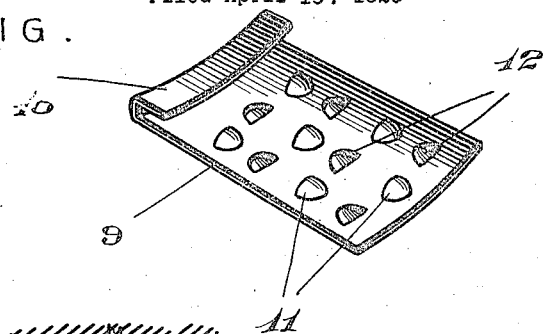
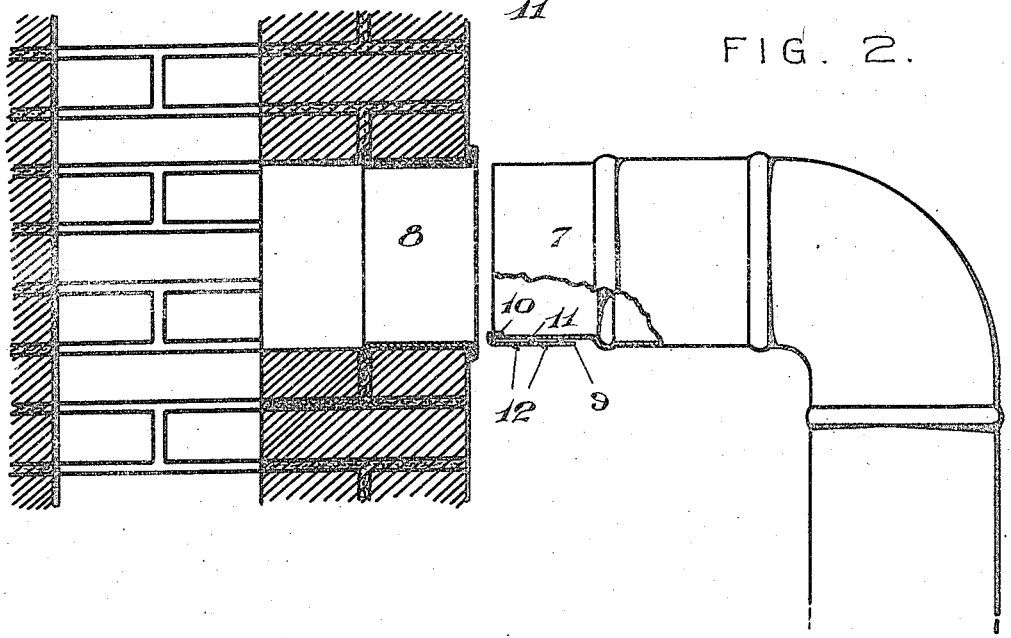
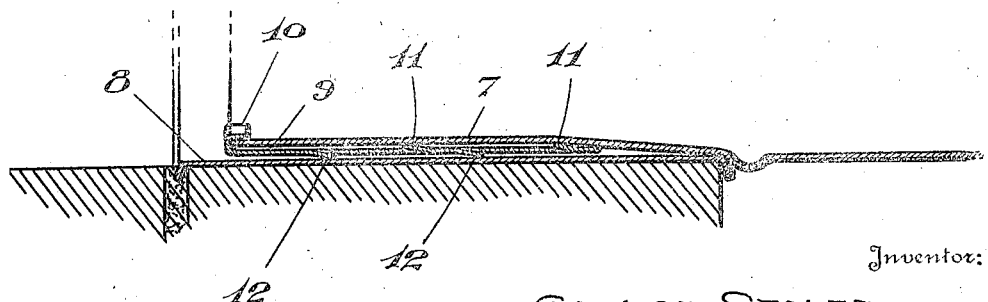
Inventor:
GEORGE STOLZE,
Attorney.

Patented Mar. 4, 1924.

1,485,736

UNITED STATES PATENT OFFICE.

GEORGE STOLZE, OF WAUSAU, WISCONSIN.

STOVEPIPE FASTENER.

Application filed April 19, 1923. Serial No. 633,129.

*To all whom it may concern:*

Be it known that I, GEORGE STOLZE, a citizen of United States, residing at Wausau, in the county of Marathon and State of Wisconsin, have invented certain new and useful Improvement in Stovepipe Fasteners, of which the following is a specification, reference being had therein to the accompanying drawing.

The present invention relates to fasteners or holders for sheet metal pipes, such as stove pipes, and aims to provide a novel and improved device of that kind which is especially useful for holding or fastening the end of a sheet metal or stove pipe in a thimble or other part in which the end of the pipe is telescoped, whereby to prevent the accidental separation of the parts.

Another object of the invention is the provision of such a fastener which is extremely simple and inexpensive in construction and manufacture, and which will also be thoroughly practical and efficient in use.

A further object is the provision of such an article which, when applied to the end of the pipe, will be moved into place when the pipe is assembled with the thimble or other part.

With the foregoing and other objects in view, which will be apparent as the description proceeds, the invention resides in the construction and formation of the article, as hereinafter described in connection with the drawing, it being understood that changes can be made within the scope of what is claimed, without departing from the spirit of the invention.

The invention is illustrated in the accompanying drawing, wherein—

Figure 1 is a perspective view of the improved device.

Fig. 2 illustrates the device applied to the end of a stove pipe and in position to enter the thimble with the pipe, portions being shown in section and portions in elevation.

Fig. 3 is an enlarged sectional detail showing the device in place between the telescoping parts.

The device constitutes a single rectangular piece of resilient sheet metal, and the piece or plate 9 has one end bent back to form a broad hook 10 extending the width of the plate. The plate and its hook are curved transversely to correspond to the curvature of the pipe, whereby the plate 9 can be placed against the outer periphery of the pipe 7 and the hook 10 engaged across or around the end of the pipe, as seen in Figs. 2 and 3.

The plate 9 has spurs or teeth 11 and 12 struck therefrom toward opposite sides, and said teeth are arranged in transverse and longitudinal rows, with the teeth 11 at one side in staggered or alternate arrangement with the teeth 12 at the opposite side. The plate 9 has transverse slits where the plate is struck toward opposite sides to form the teeth, so that the teeth have sharp edges disposed transversely of the plate and arched or convexed away from the plate at the opposite sides thereof. The edges of the teeth 11 project toward the hook 10 of the plate, while the edges of the teeth 12 at the opposite side extend away from said hook, the teeth at the opposite sides extending in opposite directions.

In using the device, the plate 9 is placed against the outer periphery of the pipe 7 with the hook 10 engaging across or around the end of the pipe, so that when the pipe 7 is shoved or slipped into the stove-pipe thimble 8 or other part, the fastener will be forced into the thimble or part 8 with the pipe 7, when the parts 7 and 8 are telescoped together. The teeth 12 extending away from the end of the pipe will slide readily along the thimble or part 8 when the device is being forced into place, with the plate 9 disposed between the pipe 7 and thimble 8, the pipe 7 springing or yielding where it extends across the plate 9, so that said pipe will be tightly clamped under spring tension between the pipe and thimble or outer part. Consequently, the teeth or spurs 11 and 12 are caused to bite the pipe and thimble, to resist the separation of the parts 7 and 8. Thus, the teeth 12 biting the thimble or part 8, will resist the movement of the device out of the thimble or part 8, and the teeth 11 biting the pipe 7 will resist the movement of the pipe 7 out of the thimble 8 relatively to the plate 9 which is frictionally held to the thimble 8. Consequently, because of the plate 9 being tightly clamped between the telescoping parts and having the teeth extending in opposite directions and biting the outer and inner parts, the separation of the parts is rendered difficult, so as to prevent such separation occurring accidentally. However, by applying sufficient force the parts can be separated.

The device can be manufactured at extremely small cost, and its application is convenient, it only being necessary to apply the device to the end of the pipe before bringing the pipes together, without involving prohibitive trouble or expense.

Having thus described the invention, what is claimed as new is:—

1. A pipe fastener comprising a sheet metal plate to be disposed and clamped between telescoping pipe portions and having means struck therefrom on opposite sides for biting and frictionally engaging said portions to resist the separation thereof.

2. A pipe fastener comprising a sheet metal plate to be clamped between telescoping pipe portions and having slits and teeth struck from the plate adjacent to the slits on opposite sides for biting and frictionally engaging said portions to resist the separation thereof.

3. A pipe fastener comprising a plate to be clamped between telescoping pipe portions and having teeth on opposite sides for biting and frictionally engaging said portions to resist the separation therefrom, said teeth at the opposite sides of the plate extending in opposite directions.

4. A pipe fastener comprising a plate to be disposed and clamped between telescoping pipe portions and having teeth struck therefrom toward opposite sides to bite and frictionally engage said portions, said teeth at the opposite sides extending in opposite directions.

5. A pipe fastener comprising a plate to be disposed and clamped between telescoping pipe portions and having means at one end to engage the end of one of said portions, said plate having teeth at the same side as said means and extending toward said means, and said plate having teeth at the opposite side extending away from said means, said teeth being such as to bite and frictionally engage said portions to resist the separation thereof.

6. A pipe fastener comprising a sheet metal plate to be disposed and clamped between overlapping pipe portions and having one end bent back into a hook to engage the end of one of said portions, said plate having teeth struck therefrom at the same side as the hook and extending toward said hook, and said plate having teeth struck therefrom at the opposite side extending away from said hook, said teeth being such as to bite and frictionally engage said portions to resist the separation thereof.

In testimony whereof I hereunto affix my signature.

GEORGE STOLZE.